(12) United States Patent
Siess et al.

(10) Patent No.: US 6,735,269 B2
(45) Date of Patent: May 11, 2004

(54) REVOLUTION COUNTER

(75) Inventors: Rainer Siess, Erlangen (DE); Ulrich Wetzel, Berga (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 10/272,474

(22) Filed: Oct. 16, 2002

(65) Prior Publication Data

US 2003/0072404 A1 Apr. 17, 2003

(30) Foreign Application Priority Data

Oct. 17, 2001 (DE) .......................................... 101 51 243

(51) Int. Cl.⁷ ................................................ G06M 3/00
(52) U.S. Cl. ................................. 377/16; 377/3; 377/15
(58) Field of Search ................................ 377/3, 15, 16

(56) References Cited

U.S. PATENT DOCUMENTS

| | | | |
|---|---|---|---|
| 3,118,075 A | 1/1964 | Dunn et al. .................... | 310/36 |
| 6,084,400 A | * 7/2000 | Steinich et al. ........ | 324/207.13 |
| 6,512,366 B2 | * 1/2003 | Siess ..................... | 324/207.25 |

FOREIGN PATENT DOCUMENTS

| | | |
|---|---|---|
| DE | 100 54 470 A1 | 5/2002 |
| EP | 0 658 745 B1 | 6/1998 |

* cited by examiner

*Primary Examiner*—Margaret R. Wambach
(74) *Attorney, Agent, or Firm*—Henry M. Feiereisen

(57) ABSTRACT

A revolution counter; includes a base body having a sensor arrangement and a power supply device which supplies energy to the sensor arrangement, and a rotary element connectable to a revolving member and rotating relative to the base body about a rotation axis. The rotary element includes a magnet arrangement, which so interacts with the power supply device that the sensor arrangement is supplied with energy during each revolution of the rotary element in at least three rotary positions of the rotary element regardless of a rotation speed of the rotary element to thereby allow the sensor arrangement to ascertain a rotary position of the rotary element. In order to prevent a transmission of mechanical forces from the rotary element to the base body, the rotary element is positioned with respect to the base body either without connection to the base body, or held by the base body at three-dimensional play.

19 Claims, 4 Drawing Sheets

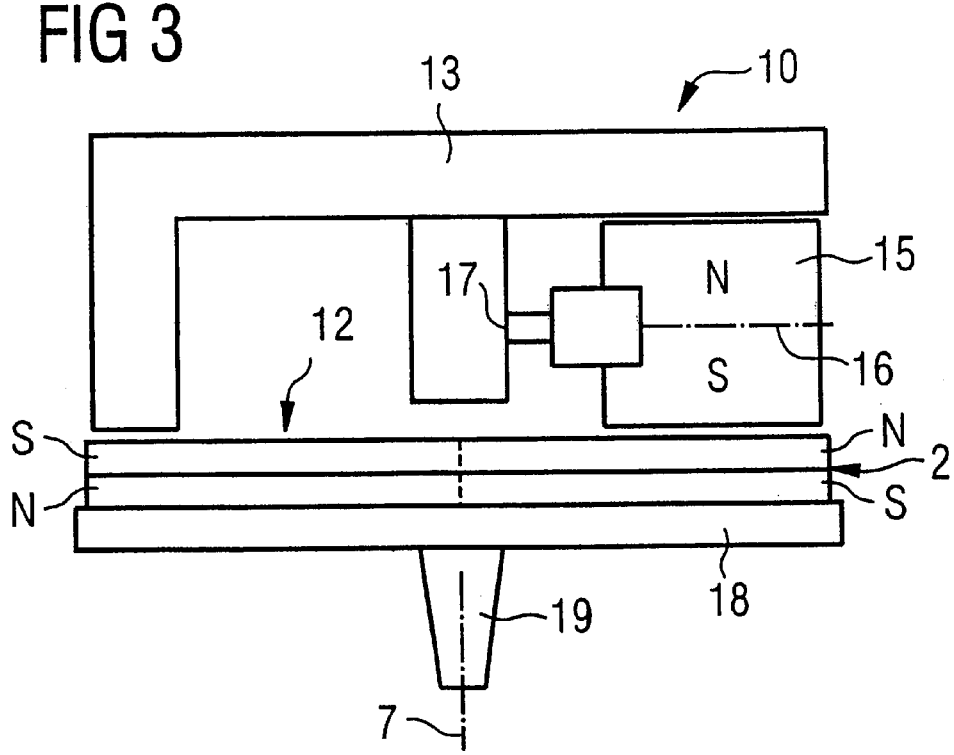
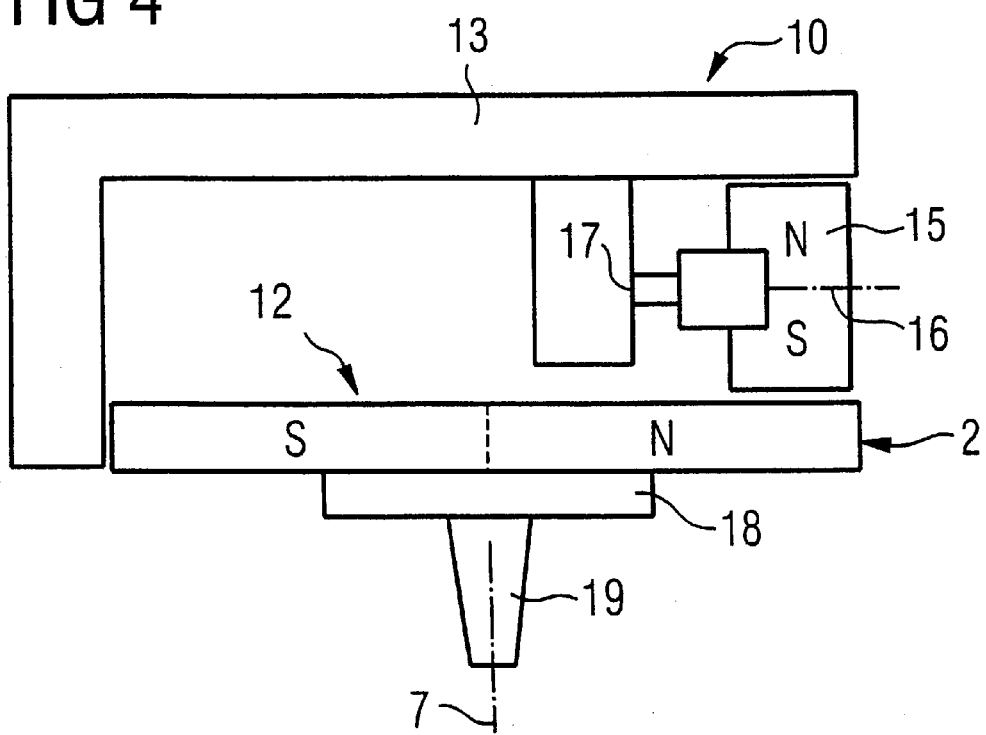

REVOLUTION COUNTER

CROSS-REFERENCES TO RELATED APPLICATIONS

This application claims the priority of German Patent Application, Serial No. 101 51 243.0, filed Oct. 17, 2001, pursuant to 35 U.S.C. 119(a)-(d), the disclosure of which is incorporated herein by reference.

BACKGROUND OF THE INVENTION

The present invention relates, in general, to a revolution counter.

European Pat. No. EP 0 658 745 B1 describes a revolution counter for ascertaining the number of revolution of a revolving shaft. The revolution counter has a base body and a rotary element which rotates about a rotation axis with respect to the base body and is securely fixed in the base body in axial and radial directions. Due to manufacturing, assembly and functional considerations, the rotation axis of the rotary element and the axis of revolution of the revolving shaft are spaced from one another so that mechanical forces and torque are transmitted from the revolving shaft via the rotary element to the base body. Damage to the support of the rotary element in the base body can thus be avoided only through provision of a compensating coupling or torque support.

It would therefore be desirable and advantageous to provide an improved revolution counter which obviates prior art shortcomings and which is simple in structure and yet reliable in operation, without requiring the provision of a compensating coupling or torque support.

SUMMARY OF THE INVENTION

According to one aspect of the present invention, a revolution counter includes a base body accommodating a sensor arrangement and a power supply device for providing electric energy to the sensor arrangement, a rotary element intended for connection to a revolving member and rotating relative to the base body about a rotation axis, a reference element intended for connection to the base body for providing a reference for the revolving element, a magnet arrangement disposed on the rotary element and so interacting with the power supply device that the sensor arrangement is supplied with energy during each revolution of the rotary element in at least three rotary positions of the rotary element regardless of a rotation speed of the rotary element to thereby allow the sensor arrangement to ascertain a rotary position of the rotary element, wherein the rotary element is positioned with respect to the base body either without connection to the base body, or held by the base body at three-dimensional play, to thereby prevent a transfer of mechanical forces from the rotary element onto the base body, when the rotary element is connected with the revolving member and the base body is connected with the reference member.

The present invention resolves prior art problems by loosely placing and thus floatingly supporting the rotary element with respect to the base body and using the revolving member for support of the rotary element, when the revolution counter is actually installed for use through connection to the revolving member. As a result, the need for a separate, substantially play-free support in the base body is thus eliminated.

According to another feature of the present invention, the power supply device may include at least one energy storage magnet, which is supported on the base body for rotation about a center axis, and a coil, whereby the energy storage magnet impulsively reverses about the center axis, when the rotary element has a rotation speed below a minimum value and reached a predetermined rotary position, to thereby induce in the coil an energy pulse for supply of energy to the sensor arrangement. In this way, the power supply to the sensor arrangement is ensured, even when the rotary element rotates slowly.

According to another feature of the present invention, the center axis may extends substantially vertical to the rotation axis. As a result, the power supply device operates especially reliable, when the rotation speed of the rotary element is below a minimum rotation speed.

According to another feature of the present invention, the energy storage magnet and the coil are magnetically coupled by a core which extends from the energy storage magnet in a direction beyond the coil to the magnet arrangement. In this way, the energy pulses, generated in the coil, have maximum energy, when the energy storage magnet is impulsively reversed. Moreover, the interconnection of the magnet arrangement with the coil is improved, when the rotation speed is above a minimum level so that the electric energy generated by the coil is increased also in this situation.

According to another feature of the present invention, the energy storage magnet may be mounted on an axle, which defines the center axis and is supported by a bearing member which is connected to the core. Thus, the gap between the energy storage magnet and the core can be adjusted in a particularly easy and precise manner, thereby further enhancing the energy content of generated energy (voltage) pulses.

According to another feature of the present invention, the core may extend beyond the coil to a position just shy above the magnet arrangement with respect to the rotation axis. In particular, when the magnet arrangement is axially magnetized, the magnetic connection between the magnet arrangement, on the one hand, and the coil and energy storage magnet, on the other hand, is especially good. As an alternative, it is also conceivable that the core end terminates next to the magnet arrangement with respect to the rotation axis, so that the gap between the magnet arrangement and the core can have narrower tolerance. In this case, the magnet arrangement may be selectively magnetized axially or radially.

According to another feature of the present invention, the rotary element may have a coupler for magnetically connecting diametrically opposite regions of the magnet arrangement. This configuration results in a further enhanced magnetic connection between the magnet arrangement and the core. A simplest design involves the provision of the coupler in the form of an iron disk which is connected to the magnet arrangement on the side facing away from the core.

In view of the floating support of the rotary element of a revolution counter according to the present invention, the rotary element can easily adjust to the configuration of a revolving member, e.g., a revolving shaft, before attachment and no mechanical forces can be transmitted from the rotary element to the base body after the rotary element is connected to the revolving member and the base body is secured to the reference element. The need for a play-free support of the rotary element is no longer required, and the arrangement of a compensating coupling or a torque support is no longer needed. Yet a revolution counter according to the present invention is reliable in operation.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 is a schematic illustration of a second embodiment of a revolution counter according to the present invention;

FIG. 4 is a schematic illustration of a third embodiment of a revolution counter according to the present invention;

DETAILED DESCRIPTION OF PREFERRED EMBODIMENTS

Figure 1:
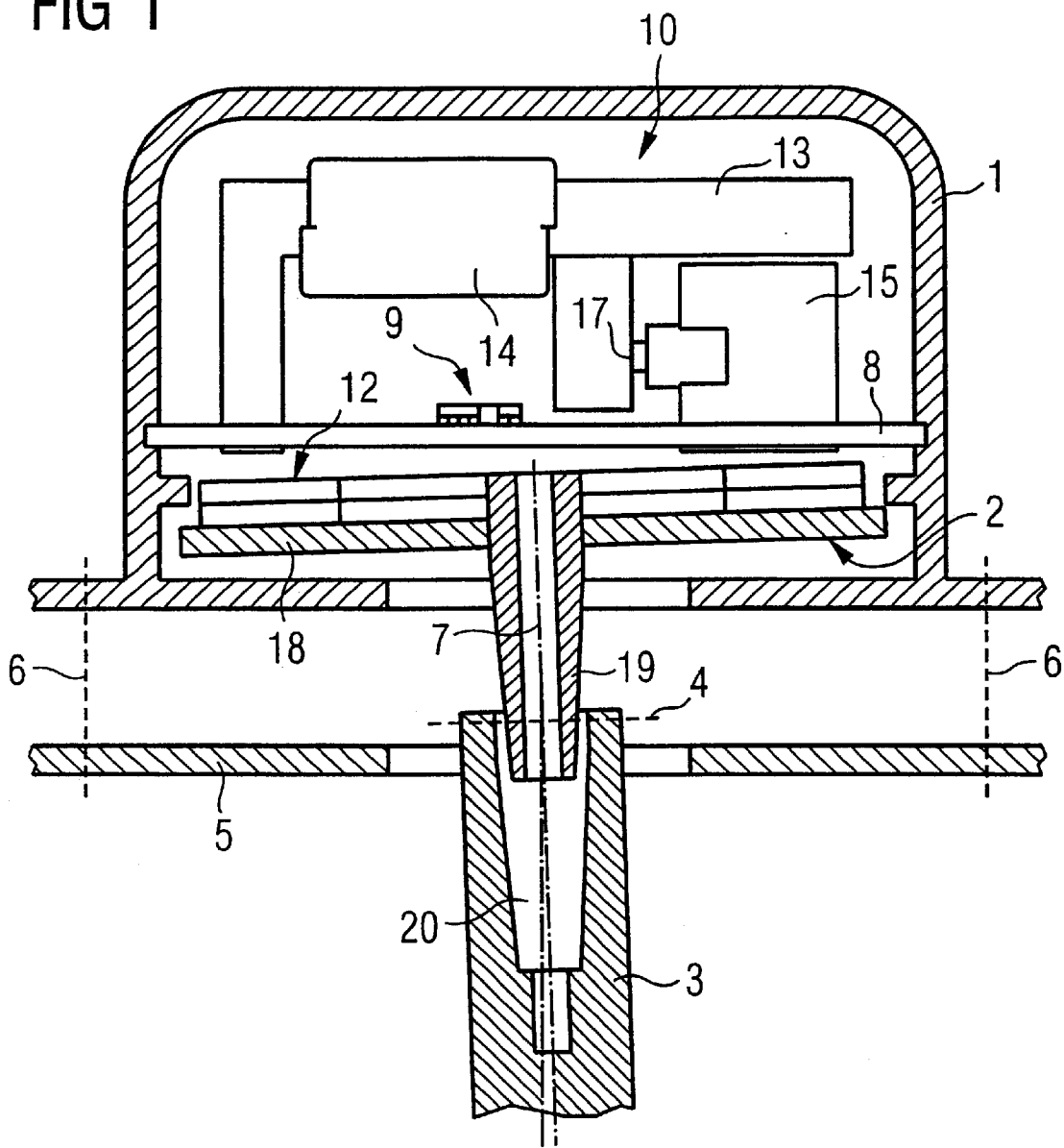
FIG. 1 is a sectional side view of a first embodiment of a revolution counter according to the present invention for subsequent attachment to a revolving member.

Throughout all the Figures, same or corresponding elements are generally indicated by same reference numerals.

Turning now to the drawing, and in particular to FIG. 1, there is shown a sectional side view of a first embodiment of a revolution counter according to the present invention, including a base body 1 and a rotary element 2 which is loosely captivated in a bottom zone of the base body 1 and held therein in a floating manner to enable a free movement in three dimensions with play. When used for ascertaining a number of revolutions of a revolving member 3, the rotary element 2 can be connected in fixed rotative engagement with the revolving member 3. Reference numeral 4 denotes by way of example the provision of a screw connection 4, as indicated by broken line in FIG. 1, for subsequent securement of the revolution counter to the revolving member 3. The base body 1 is connectable, e.g. by screw fasteners 6, as indicated by broken lines in FIG. 1, to a reference element 5 for the revolving member 3.

As a consequence of the three-dimensional play and thus floating support by which the rotary element 2 is received in the base body 1, the rotary element 2 can adjust to force impacts, when secured to the revolving member 3, without transmitting mechanical forces to the base body 1. Even after connection of the rotary element 2 to the revolving member 3, and after connection of the base body 1 to the reference element 5, no mechanical forces can be transmitted from the rotary element 2 to the base body 1, during rotation of the revolving member 3 and the attached rotary element 2, because the support of the rotary element 2 is realized solely by the revolving member 3, without connection to the base body 1.

The rotary element 2 can rotate relative to the base body 1 about a rotation axis 7 before and after the securement to the revolving member 3. A rotary position of the rotary element 2 can be ascertained by a circuit board 8 which is supported in the base body 1 and carries a sensor arrangement 9 and a power supply device 10 which provides electric energy to the sensor arrangement 9. The sensor arrangement 9 includes at least two sensors 9'. Presently preferred, however, is a configuration of the sensor arrangement 9 with three sensors 9', as shown in the non-limiting example of FIG. 2. The sensors 9' are angularly offset relative to one another by about 60° with respect to the rotation axis 7 and scan a signature 11 of the rotary element 2.

Figure 2:
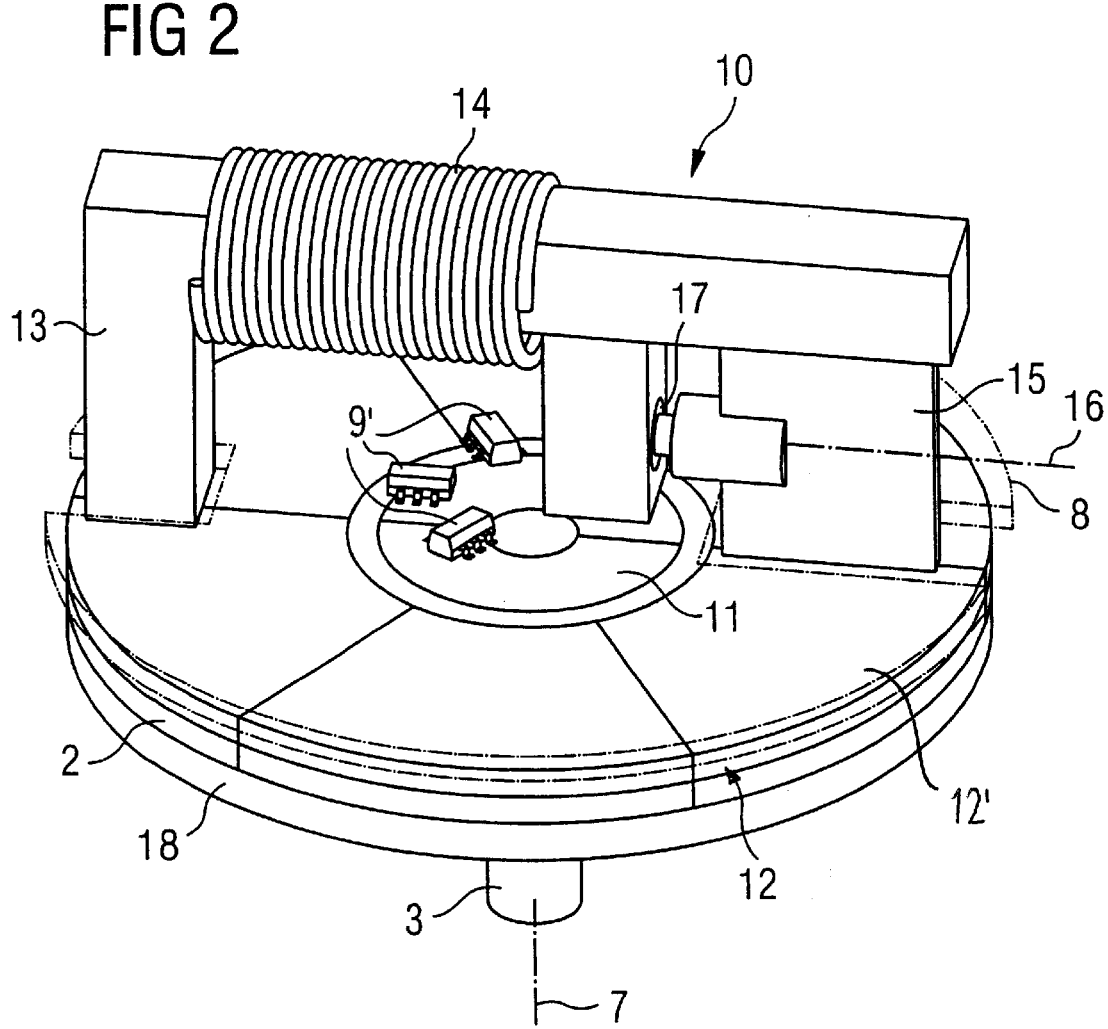
FIG. 2 is a perspective view of the revolution counter of FIG. 1.

The signals registered by the sensors 9' enable a precise determination of the rotary position of the rotary element 2. In the example of FIG. 2, the rotary position can be ascertained precisely to 60°. In general, at least three rotary positions should be registered per revolution of the rotary element 2 to correctly determine the number of revolutions of the rotary element 2 and thus of the revolving member 3.

An exemplified construction and manner in which a sensor arrangement may be operatively and functionally incorporated into a revolution counter of the present invention is fully described in the afore-mentioned European Pat. No. EP 0 658 754 B1 which discloses a sensor arrangement for detecting the rotary position of the rotary element only at the predetermined positions where the power supply device for providing the sensor arrangement with electric energy is excited. An alternative construction of a sensor arrangement is disclosed in commonly assigned copending patent application by the same inventive entity, entitled "Rotary Position Transmitter for Registering a Rotary Position", filed on May 3, 2001 and based on German patent specification DE 100 54 470, published on May 23, 2002, the disclosure of which is incorporated herein by reference. This sensor arrangement is constructed to register any rotary position as soon as the sensor arrangement is supplied with energy. Also the configuration of the signature 11 does not form part of the present invention and thus has not been described in detail.

In order to provide a correct reading of the rotary positions and resultant determination of the number of revolutions of the rotary element 2, even when the external power supply has failed or is switched off, the rotary element 2 of the revolution counter includes a magnet arrangement, generally designated by reference numeral 12 and comprised of an even number of sectors 12', which are oppositely magnetized in alternating fashion. As shown in FIG. 2, the magnet arrangement 12 has six such sectors 12', which constitutes a minimum number of sectors 12'.

The power supply device 10 includes a core 13 and a coil 14 which is traversed by the core 13. When the rotary element 2 rotates at greater rotation speeds, i.e. at a rotation speed above a minimum value, the magnet arrangement 12 acts directly on the coil 14 via the core 13. Electric energy generated hereby in the coil 14 is sufficient to ensure a continuous supply of electric energy to the sensor arrangement 9, when the rotation speed of the rotary element 2 is above the minimum rotation speed. As a result, the sensor arrangement 9 is able to continuously ascertain the rotary position of the rotary element 2. The determination of the rotary position of the rotary element 2 by the sensor arrangement 9 is fast enough to register at least three rotary positions of the rotary element 2 per revolution of the rotary element 2, regardless of the rotation speed of the rotary element 2. Persons skilled in the art will understand that the minimum rotation speed is dependent on the constructions involved and may differ from situation to situation. Without limiting the scope of the disclosure, the minimum rotation speed for a revolution counter according to the invention may be in the magnitude of 500 rpm.

When, however, the rotation speed of the rotary element 2 drops below a minimum value, a continuous supply of electric energy to the sensor arrangement 9 can no longer be assured because the changes in magnetic flux as induced by the magnet arrangement 12 in the coil 14 are insufficient. To ensure a determination of at least three rotary positions of the rotary element 2 per revolution in situations when the rotation speed drops below the minimum rotation speed, and thus to ensure a correct detection of the revolutions of the rotary element 2, the power supply device 10 includes a backup system in the form of an energy storage magnet 15. The energy storage magnet 15 is mounted on an axle 16 for rotation about a center axis which extends substantially perpendicular to the rotation axis 7 of the rotary element 2.

When the rotation speed of the rotary element 2 drops below the minimum level, the core 13, the energy storage magnet 15 and the magnet arrangement 12 so interact that the energy storage magnet 15 impulsively reverses, when the rotary element 2 reaches predetermined rotary positions. The predetermined rotary positions correspond hereby essentially to the rotary positions in which the transition between two sectors 12' is situated just about underneath the energy storage magnet 15. As the energy storage magnet 15 is reversed, an energy pulse is induced each time in the coil 14 to temporarily supply the sensor arrangement 9 with electric energy. Thus, the sensor arrangement 9 is operated for a brief period at the moment of generation of the energy pulse to thereby enable a detection of the rotary position of the rotary element 2.

As a consequence, the sensor arrangement 9 is thus able to determine the rotary position of the rotary element 2 at any rotation speed by ascertaining at least three rotary positions per revolution of the rotary element 2. Based on the sequence of the determined rotary positions, the number of revolutions executed by the rotary element 2 can then be ascertained.

The magnetic coupling between the energy storage magnet 15 and the coil 14 is realized substantially by the core 13. As shown in FIGS. 1 and 2, the core 13 extends from the energy storage magnet 15 beyond the coil 14 and is angled downwards in the direction of the magnet arrangement 12, whereby the core 13 terminates just shy of the magnetic arrangement 12, i.e. above the magnet arrangement 12. By extending the core 13 to the magnet arrangement 12, two effects are realized: Firstly, the securement of the energy storage magnet 15 to the core 13 is enhanced and longer before a reversal occurs, so that energy pulses, generated in the coil 14 when the rotation speed of the rotary element 2 is low, have a higher energy content. Secondly, the coupling between the magnet arrangement 12 and the coil 14 is improved, when the rotary element 2 rotates at greater rotation speed, i.e. rotation speed above the minimum level.

The gap between the energy storage magnet 15 and the core 13 should be kept as small as possible, when the energy storage magnet 15 is secured before reversal. This can be realized by supporting the shaft 16 in a bearing member 17 which is connected to the core 13. In this way, the gap between the energy storage magnet 15 and the core 13 can be adjusted in a particularly accurate manner. The energy content of the voltage pulses generated during reversal of the energy storage magnet 15 can thus be maximized.

Referring now to FIG. 3, there is shown a schematic illustration of a second embodiment of a revolution counter according to the present invention. Parts corresponding with those in FIG. 1 are denoted by identical reference numerals and not explained again. In this embodiment, provision is made for an axial magnetization of the sectors 12' of the magnet arrangement 12 with respect to the rotation axis 7. In other words, a north pole is positioned above a south pole in axial direction.

Another variation is shown in FIG. 4, in which the core 13 is so extended beyond the coil 14 that its end portion is positioned relative to the rotation axis 7 next to the magnet arrangement 12. In this configuration, the gap between the magnet arrangement 12 and the core 13 can have narrower tolerance, and the sectors 12' of the magnet arrangement 12 may selectively be magnetized relative to the rotation axis 7 in axial or radial directions. Of course, it is also possible, to configure and arrange the energy storage magnet 15 in side-by-side disposition to the magnet arrangement 12 and the core 13. In this case, a radial magnetization of the sectors 12' is more suitable than a magnetization in axial direction.

In the embodiments of the revolution counter according to the present invention, as shown in FIGS. 1 to 4, the rotary element 2 has also a coupler 18, which is connected to the magnet arrangement 12 on the side distal to the power supply device 10, for magnetically connecting diametrically opposite sectors 12' of the magnet arrangement 12. In a simple configuration, the coupler 18 is a disk of ferromagnetic material, e.g., steel.

The rotary element 2 is further provided with a pin 19 which extends downwards through the coupler 18 in the direction of the revolving member 3 for engagement in a recess 20 of the revolving member 3. Suitably, the pin 19 and the recess 20 have complementary tapered configuration. In the embodiments of FIGS. 1 to 4, the interaction between the pin 19 and the recess 20 is, however, secondary because, as shown in FIG. 1, the rotary element 2 is supported by the revolving member 3 via the screw connection 4.

Figure 5:
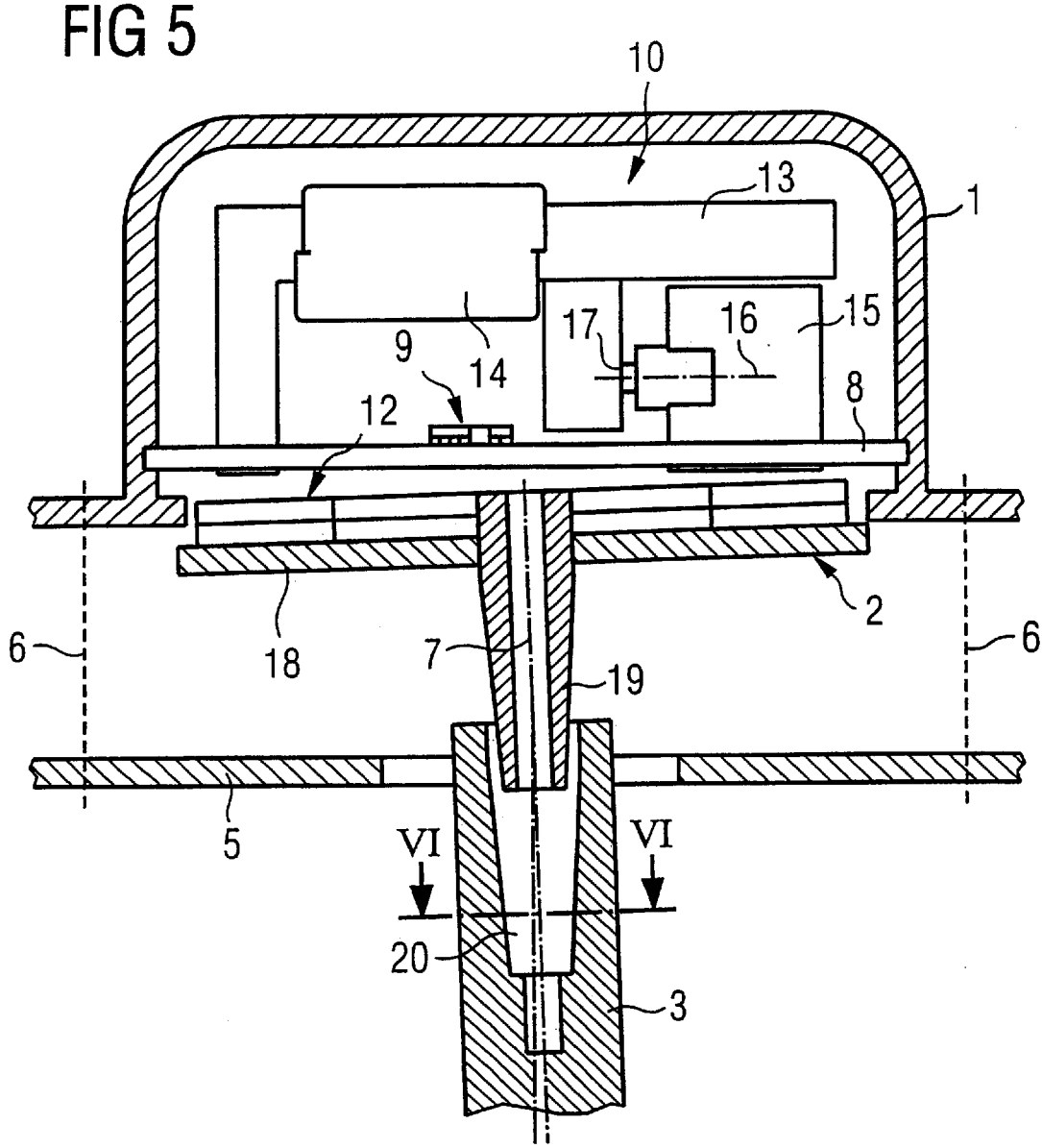
FIG. 5 is an exploded sectional side view of a fourth embodiment of a revolution counter according to the present invention for subsequent attachment to a revolving member.
Figure 6:
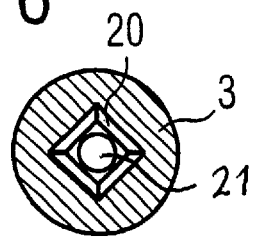
FIG. 6 is a sectional view of a revolving member, taken along the line VI—VI in FIG. 5.

Turning now to FIG. 5, there is shown an exploded sectional side view of another embodiment of a revolution counter according to the present invention. Parts corresponding with those in FIGS. 1 to 4 are denoted by identical reference numerals and not explained again. In this embodiment, the rotary element 2 is not held by the base body 1 at all, but rather is situated outside the base body 1. In this embodiment, the rotary element 2 can be threadably connected to the revolving member 3 in a simple manner by a single, centrally arranged screw 21 (FIG. 6). The fixed rotative engagement between the rotary element 2 and the revolving member 3 is hereby realized by the complementary configuration of the pin 19 of the rotary element 2 with the recess 20 of the revolving member 3. In contrast to the embodiments of FIGS. 1 to 4, the pin 19 is now securely fitted within the recess 20. As shown in FIG. 6, the recess 20 has a square cross section and tapers with increasing depth. Of course, the square configuration of the recess 20 is shown by way of example only, as other configurations are certainly within the scope of the present invention. In the embodiment of FIG. 5, in view of the complementary configuration of the pin 19, a form-fitting engagement between rotary element 2 and the revolving member 3 is thus established which is enough to keep these components together so that the screw 21 can assume only a safety function.

Persons skilled in the art will understand that a revolution counter according to the present invention is equally applicable without or with central hollow (quill transmitter).

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A revolution counter; comprising:

a base body;

a rotary element intended for connection to a revolving member and rotating relative to the base body about a rotation axis;

a reference element intended for connection to the base body for providing a reference for the revolving element;

a sensor arrangement accommodated in the base body;

a power supply device disposed on the base body for supply of energy to the sensor arrangement;

a magnet arrangement disposed on the rotary element and so interacting with the power supply device that the sensor arrangement is supplied with energy during each revolution of the rotary element in at least three rotary positions of the rotary element regardless of a rotation speed of the rotary element to thereby allow the sensor arrangement to ascertain a rotary position of the rotary element;

wherein the rotary element is positioned with respect to the base body in a manner selected from the group consisting of without connection to the base body, and held by the base body at three-dimensional play, to thereby prevent a transmission of mechanical forces from the rotary element onto the base body, when the rotary element is connected with the revolving member and the base body is connected with the reference member.

2. The revolution counter of claim 1, wherein the power supply device includes at least one energy storage magnet, which is supported by the base body for rotation about a center axis, and a coil, said energy storage magnet impulsively reversing about the center axis, when the rotary element has a rotation speed below a minimum value and reached a predetermined rotary position, to thereby induce in the coil an energy pulse for supply of energy to the sensor arrangement.

3. The revolution counter of claim 2, wherein the center axis extends substantially vertical to the rotation axis.

4. The revolution counter of claim 2, and further comprising a core for magnetically coupling the energy storage magnet and the coil, said core extending from the energy storage magnet in a direction beyond the coil to the magnet arrangement.

5. The revolution counter of claim 4, wherein the energy storage magnet is mounted on a shaft which defines the center axis, and further comprising a bearing member supporting the shaft and connected to the core.

6. The revolution counter of claim 4, wherein the core extends beyond the coil to terminate above the magnet arrangement with respect to the rotation axis.

7. The revolution counter of claim 4, wherein the core extends beyond the coil to terminate next to the magnet arrangement with respect to the rotation axis.

8. The revolution counter of claim 1, wherein the rotary element has a coupler for magnetically coupling diametrically opposite regions of the magnet arrangement.

9. The revolution counter of claim 1, wherein the coupler is a disk made of ferromagnetic material and connected to the magnet arrangement on a side distal from the power supply device.

10. The revolution counter of claim 1, wherein the ferromagnetic material is steel.

11. The revolution counter of claim 1, wherein the magnet arrangement has several sectors which are oppositely magnetized and magnetized with respect to the center axis axially or radially.

12. The revolution counter of claim 1, and further comprising a screw connection for threadably engaging the rotary element and the revolving member.

13. The revolution counter of claim 12, wherein the screw connection includes a single screw.

14. The revolution counter of claim 1, and further comprising a form-fitting connection for connecting the rotary element and the revolving member.

15. A revolution counter for connection to a revolving member for determination of a number of revolutions; comprising:

a base body;

a rotary element floatingly supported with respect to the base body so as to allow the rotary element to freely move upon attachment to a revolving member in fixed rotative engagement;

a sensor arrangement disposed in the base body for ascertaining a rotary position of the rotary element; and a power supply device disposed in the base body for supply of energy to the sensor arrangement.

16. The revolution counter of claim 15, wherein the power supply device includes a first magnetic assembly which provides electric energy to the sensor arrangement, when the rotary element rotates at a rotation speed above a minimum value, and a second magnet assembly which provides electric energy to the sensor arrangement, when the rotation speed of the rotary element drops to or below the minimum value.

17. The revolution counter of claim 16, wherein the first magnetic assembly includes a coil and a core extending through the coil for inducing an energy pulse in the coil as the rotary element rotates at the rotation speed above the minimum level, and wherein the second magnet assembly includes at least one energy storage magnet, which is supported by the base body and impulsively reverses, when the rotation speed of the rotary element drops to or below the a minimum value and the rotary element reaches a predetermined rotary position, to thereby induce in the coil an energy pulse for supply of energy to the sensor arrangement.

18. The revolution counter of claim 15, and further comprising a screw connection for floating support of the rotary element by the revolving member.

19. The revolution counter of claim 15, wherein the rotary element is press-fitted in the revolving member.

* * * * *